(12) United States Patent
Chen et al.

(10) Patent No.: US 6,359,868 B1
(45) Date of Patent: Mar. 19, 2002

(54) METHOD AND APPARATUS FOR TRANSMITTING AND RECEIVING DATA MULTIPLEXED ONTO MULTIPLE CODE CHANNELS, FREQUENCIES AND BASE STATIONS

(75) Inventors: Tao Chen; Edward G. Tiedemann, Jr., both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/686,350

(22) Filed: Oct. 10, 2000

Related U.S. Application Data

(63) Continuation of application No. 08/929,380, filed on Sep. 15, 1997, now Pat. No. 6,215,777.

(51) Int. Cl.[7] ............................................... H04J 13/00
(52) U.S. Cl. ...................... 370/335; 370/342; 370/482
(58) Field of Search ............................. 370/335, 342, 370/481, 482; 375/347

(56) References Cited

U.S. PATENT DOCUMENTS 5,504,783 A * 4/1996 Tomisato et al. ........... 375/267
6,215,777 B1 * 4/2001 Chen et al. ................. 370/335

* cited by examiner

*Primary Examiner*—Melvin Marcelo
(74) *Attorney, Agent, or Firm*—Philip Wadsworth; Kent D. Baker; Pavel Kalousek

(57) ABSTRACT

In the present invention, high speed data is provided by transmitting data on multiple carrier frequencies, multiple code channels and/or from multiple base stations. In a first embodiment of the present invention, multiplexed code symbols are transmitted on a plurality of carrier frequencies from the same base station. In second embodiment, code symbols are transmitted on multiple carrier frequencies with at least one corner frequency providing the code symbols is a multiple code channels. In a third embodiment, a subset of the multiplexed code symbols are redundantly provided on a different carrier from at least one additional base station. In a fourth embodiment, multiplexed symbols as transmitted on different carriers from the same base station and are redundantly transmitted on another set of carriers from a different base station. In a fifth embodiment, code symbols are multiplexed onto carriers from a plurality of base stations for increased throughput. In a sixth embodiment, code symbols are transmitted on carriers from a first base station and redundantly provided on at least one additional base station on the same carriers as used by the first base station.

4 Claims, 6 Drawing Sheets

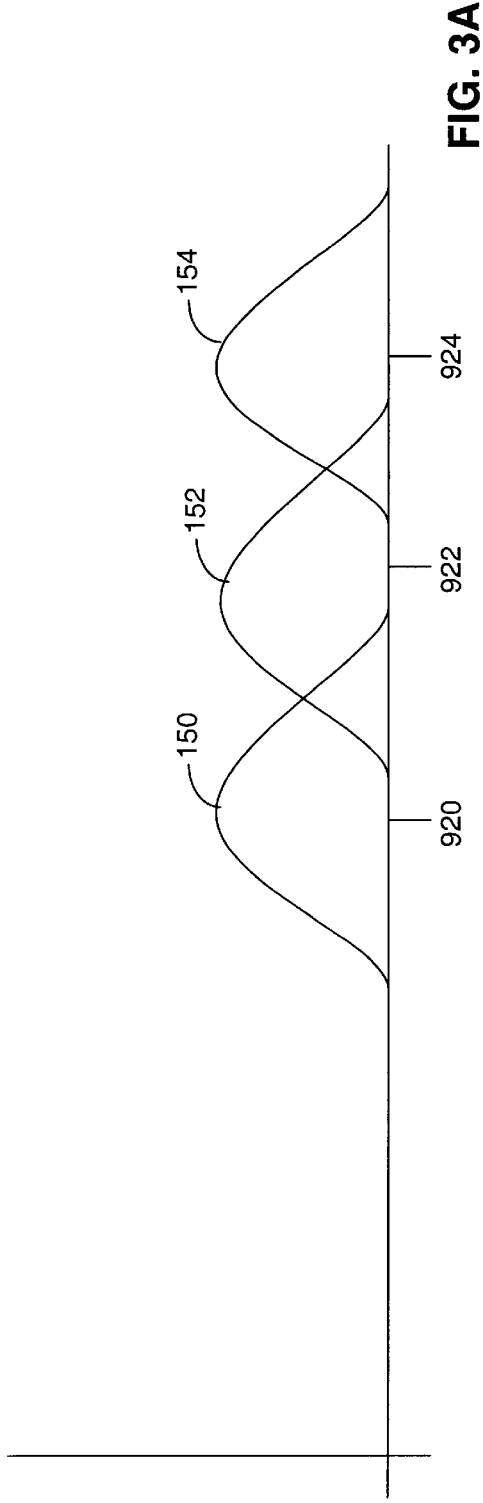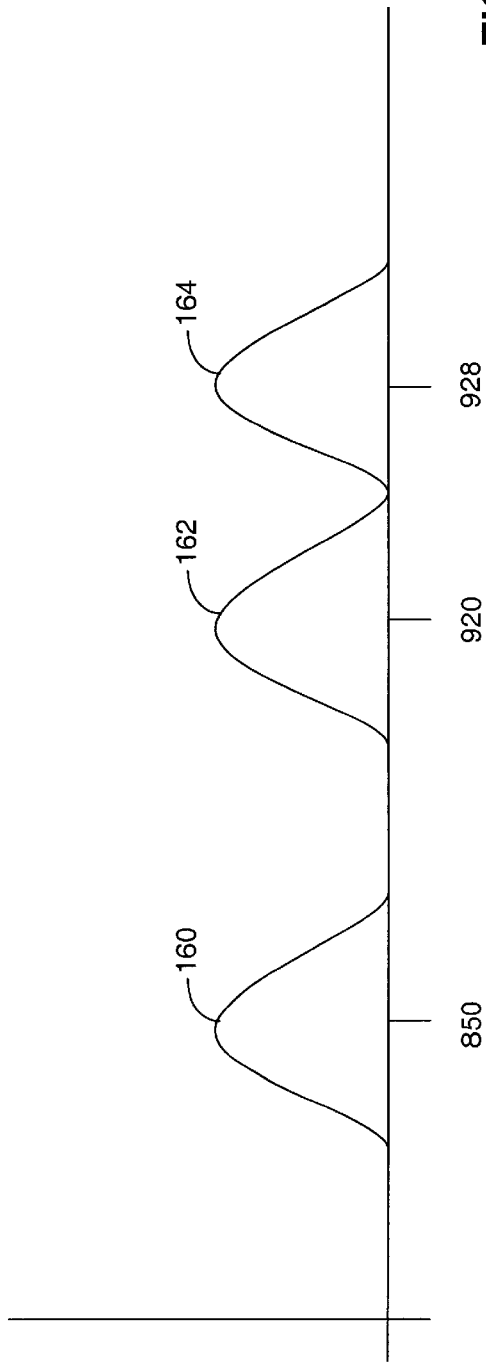

METHOD AND APPARATUS FOR TRANSMITTING AND RECEIVING DATA MULTIPLEXED ONTO MULTIPLE CODE CHANNELS, FREQUENCIES AND BASE STATIONS

CROSS REFERENCE

This is a continuation application of application Ser. No. 08/929,380, filed Sep. 15, 1997, entitled "Method and Apparatus for Transmitting and Receiving Data Multiplexed Onto Multiple Code Channels, Frequencies and Base Stations now U.S. Pat. No. 6,215,777.

BACKGROUND OF THE INVENTION

I. Field of the Invention

The present invention relates to communications. More particularly, the present invention relates to a novel and improved method and apparatus for increasing the available data rate to and from a wireless station by multiplexing signals onto multiple carriers, multiple spread spectrum code channels and/or from multiple base stations.

II. Description of the Related Art

The present invention is concerned with transmitting data at rates which are higher than the capacity of a single CDMA channel. Many solutions to this problem have been proposed. One solution is to allocate multiple channels to the users and allow those users to transmit and receive data in parallel on the plurality of channels available to them. Two methods for providing multiple CDMA channels for use by a single user are described in co-pending U.S. Pat. No. 6,005,855, entitled "METHOD AND APPARATUS FOR PROVIDING VARIABLE RATE DATA IN A COMMUNICATIONS SYSTEM USING STATISTICAL MULTIPLEXING", issued Dec. 21, 1999, and U.S. Pat. No. 5,777,999, entitled "METHOD AND APPARATUS FOR PROVIDING VARIABLE RATE DATA IN A COMMUNICATIONS SYSTEM USING NON-ORTHOGONAL OVERFLOW CHANNELS", issued Jul. 7, 1998, both of which are assigned to the assignee of the present invention and are incorporated by reference herein. In addition, frequency diversity can be obtained by transmitting data over multiple spread spectrum channels that are separated from one another in frequency. A method and apparatus for redundantly transmitting data over multiple CDMA channels is described in U.S. Pat. No. 5,166,951, entitled "HIGH CAPACITY SPREAD SPECTRUM CHANNEL", which is incorporated by reference herein.

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of the utilization of path diversity are illustrated in copending U.S. Pat. No. 5,101,501 entitled "SOFT HANDOFF IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

SUMMARY OF THE INVENTION

The present invention is a novel and improved method and apparatus for the transmission of high speed data in spread spectrum communication systems. In the present invention, high speed data is provided by transmitting data on multiple carrier frequencies, multiple code channels and/or from multiple base stations. In a first embodiment of the present invention, multiplexed code symbols are transmitted on a plurality of carrier frequencies from the same base station. In second embodiment, code symbols are transmitted on multiple carrier frequencies with at least one corner frequency providing the code symbols is a multiple code channels. In a third embodiment, a subset of the multiplexed code symbols are redundantly provided on a different carrier from at least one additional base station. In a fourth embodiment, multiplexed symbols as transmitted on different carriers from the same base station and are redundantly transmitted on another set of carriers from a different base station. In a fifth embodiment, code symbols are multiplexed onto carriers from a plurality of base stations for increased throughput. In a sixth embodiment, code symbols are transmitted on carriers from a first base station and redundantly provided on at least one additional base station on the same carriers as used by the first base station.

The present invention further describes a method wherein a receiver can demodulate data on a plurality of channels and can allocate a demodulator or set of demodulators to search for other available systems, while maintaining the current level of data throughput. In addition the present invention describes a method for receiving multiple paging channels on a plurality of frequencies and code channels.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3A–3B are illustrations of the frequency bands of the present invention;

DETAILED DESCRIPTION OF THE PREFERRED EMBODIMENTS

I. Single Code Channel Per Frequency Band

Figure 1:
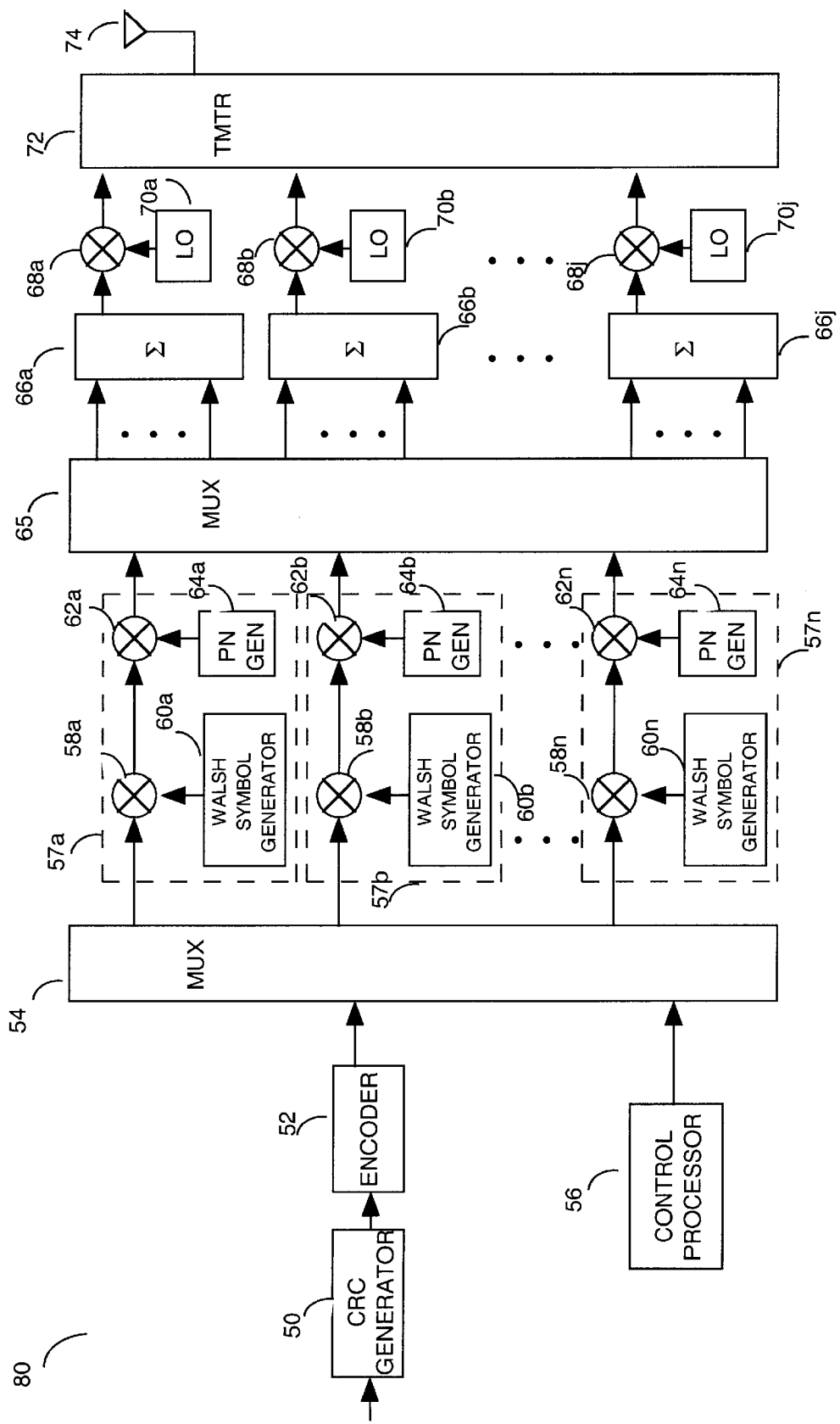
FIG. 1 is a block diagram illustrating a base station of the present invention.

Referring to the figures, FIG. 1 illustrates a base station 80 of the present invention. It shall be noted that in the exemplary embodiment, the transmission occurs from the base station to a remote station, but that this embodiment could be implemented for transmissions from the remote station to the base station. In the first embodiment of the present invention encoded symbols of data are multiplexed onto a plurality of frequencies and transmitted on a single code channel per frequency as illustrated by Table 1 below.

TABLE 1

| $BS_1, f_1$ | $S_1$ | $S_4$ | $S_7$ | $S_{10}$ | ■ |
| $BS_1, f_2$ | $S_2$ | $S_5$ | $S_8$ | $S_{11}$ | ■ |
| $BS_1, f_3$ | $S_3$ | $S_6$ | $S_9$ | $S_{12}$ | ■ |

This implementation provides frequency diversity which can reduce the effects of frequency dependent fading which can degrade the reliability of wireless communication. FIGS. 3A and 3B illustrate the frequency bands for data transmitted using a multiple carrier scheme. Often a service provider will buy a block of bandwidth and divide the band up such that the frequencies are adjacent to one another. This situation is illustrated in FIG. 3A. However the present invention is equally applicable to cases where the bands are not adjacent as is illustrated in FIG. 3B. The spread spectrum technique of CDMA provides inherent frequency diversity and the present invention provides additional frequency diversity through the use of multiple spread spectrum signals transmitted on a plurality of frequencies.

Frames of data to be transmitted by base station 80 is provided to CRC generator 50. CRC generator 50 generates and appends a set of cyclic redundancy check (CRC) bits to the frame of data and in the exemplary embodiment appends a set of tail bits. The frame is then provided to encoder 52. In the exemplary embodiment, encoder 52 is a convolutional encoder. The encoded symbols are provided to multiplexer (MUX) 54. Multiplexer 54 provides the encoded symbols on different outputs in response to a signal from control processor 56. Each output of multiplexer 54 is provided to a corresponding code channel modulator 57a–57n. In the first exemplary embodiment, one code channel is allocated for each frequency. Thus, in the first exemplary embodiment the subscript "n" is equal to the subscript "j".

Each of spreading means 58a–58n is driven by a corresponding Walsh symbol generator 60a–60n. It will be understood that Walsh channels are but one method of providing code channels in a CDMA system and that the present invention is equally applicable to other methods of code channel generation. In the exemplary embodiment, each of Walsh symbol generators 60a–60n outputs a spreading sequence that is mutually orthogonal to the remaining spreading sequences. In alternative embodiment, the data can be channeled by means of other modulation techniques, such as phase in the QPSK signal. Moreover, it should be understood that if the signals are transmitted using different PN offsets or on different carriers or from different antennas, then the Walsh sequence spreading need not be orthogonal or even different. In the exemplary embodiment, each of the spread signals from spreading means 58a–58n are provided to a scrambling means 62a–62n. Scrambling means 62a–62n scramble the data in accordance with scrambling sequence provided by PN generators 64a–64n. The method and apparatus for performing orthogonal spreading and for performing scrambling in accordance with a pseudonoise sequence is described in detail in the aforementioned U.S. Pat. Nos. 4,901,307 and 5,103,459.

The modulated data from scramblers 62a–62n are provided to multiplexer 65 which directs the data to one of summers 66a–66j In the first embodiment wherein one code channel is allocated for each carrier, multiplexer 65 and summers 66a–66j are unnecessary and the code channel modulated data can be provided directly to an upconversion means 68a–68j. Each of upconverters 68a–68j are driven by a corresponding local oscillator 70a–70j which outputs a different frequency sinusoid. The upconverted signals are provided to transmitter 72, which filters and amplifies the signal and provides it for transmission through antenna 74.

Figure 2A:
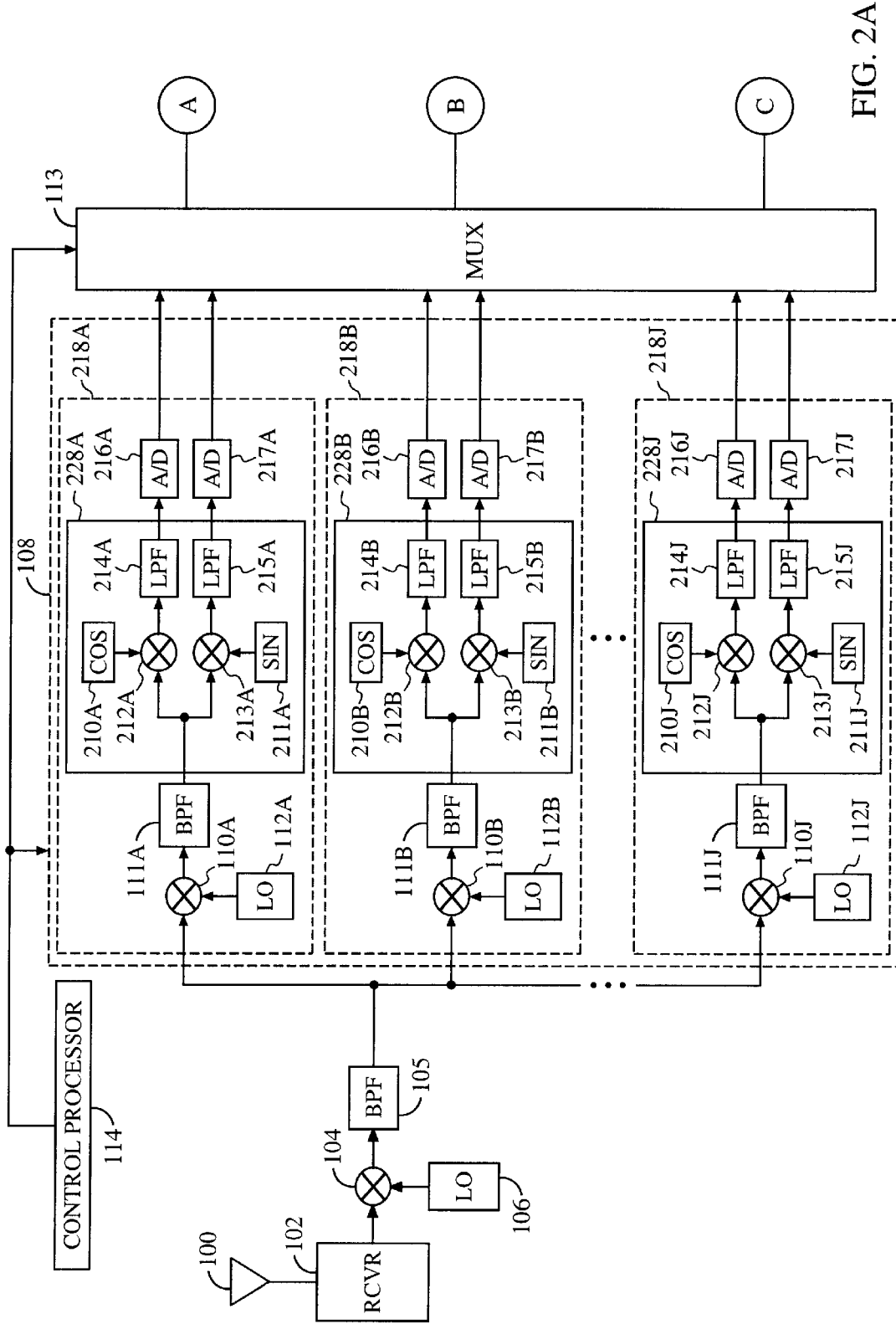
FIGS. 2A–B are block diagrams illustrating a receiver system of the present invention.
Figure 2B:
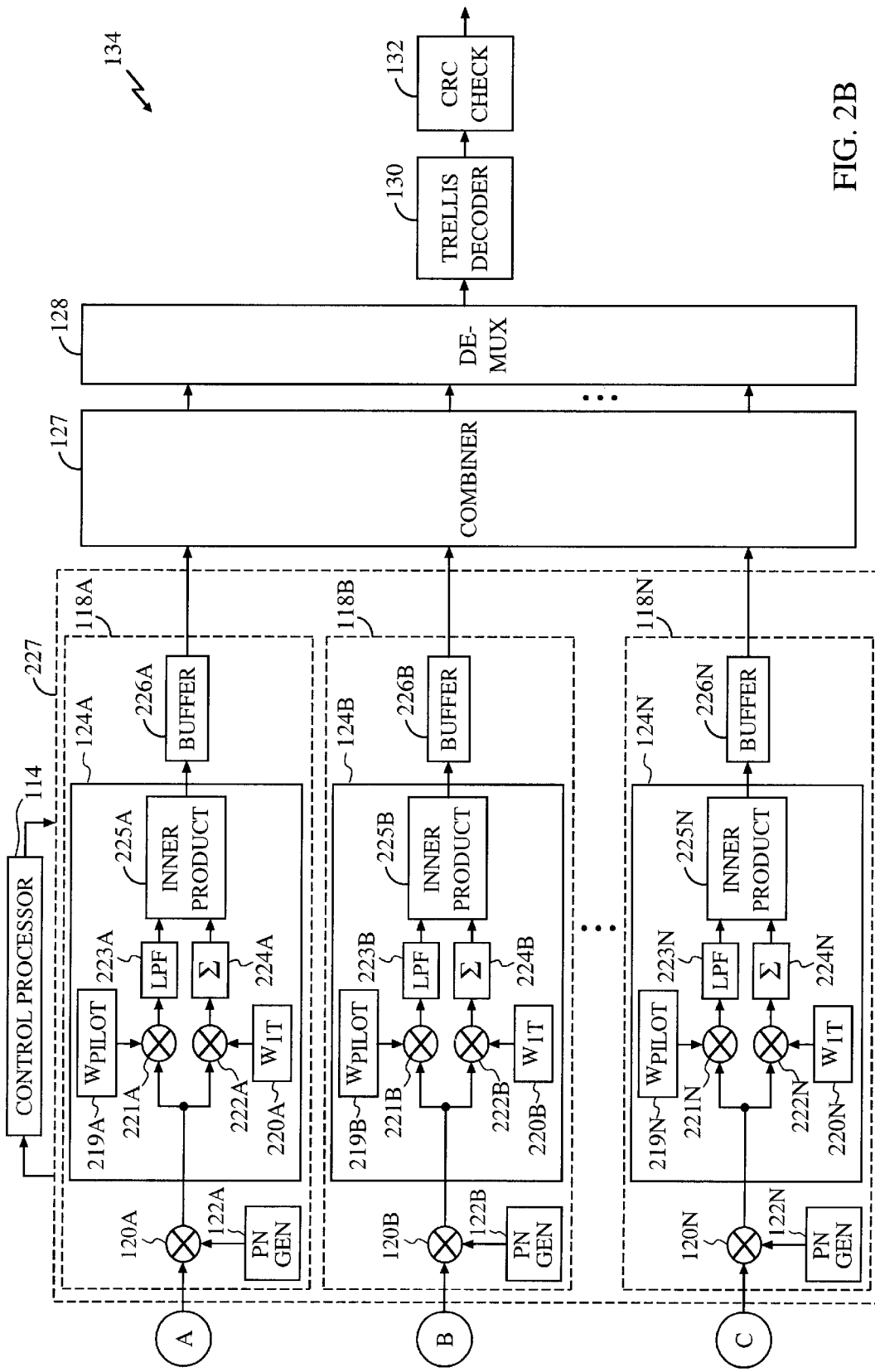

FIGS. 2A–2B illustrate the receiver system of the present invention. In the exemplary embodiment, the downconversion of the transmitted signal occurs in two stages. A first downconversion is performed to bring the signal down to an intermediate frequency. Then, a second downconversion is performed to bring the intermediate frequency signal down to baseband. In the present context, baseband refers to the frequency of the spread signal.

Referring to FIGS. 2A–2B, downconverter 104 performs an initial downconversion to a lower frequency, then downconverters 110a–110j perform a second downconversion to a lower frequency which is QPSK (Quaternary Phase Shift Keying) demodulated into I and Q signals. Referring to FIG. 3A, the data is provided in three bands. The first signal 150 is transmitted on a frequency of 920 MHz, the second signal 152 is transmitted on as frequency of 922 MHz, and the third signal is transmitted on a frequency of 924 MHz. In order to demodulate data transmitted on these three bands, the data signal might first be down converted by 900 MHz to provide signals at 20 MHz, 22 MHz and 24 MHz to downconverters 110a–110j, which complete the downconversion. A first downconverter 104 performs a downconversion of 18 MHz to provide a first low frequency signal at 2 MHz. A second downconverter 110 performs a downconversion of 20 MHz to provide a second low frequency signal at 2 MHz. A third downconverter 110 performs a downconversion of 22 MHz to provide a third low frequency signal at 2 MHz.

Referring to FIG. 3B, the data is again provided in three bands, although the present invention is easily extendible to an arbitrary number of bands. The first signal 160 is transmitted on a frequency of 850 MHz, the second signal 162 is transmitted on a frequency of 920 MHz, and the third signal is transmitted on a frequency of 928 MHz. In order to demodulate data transmitted on these three bands, the signals might first be down converted by 800 MHz and then provided to downconverters 110a–110j, which would complete the downconversion to a baseband. A first downconverter 104 performs a downconversion of 48 MHz to provide a first low frequency signal at 2 MHz. A second downconverter 110 performs a downconversion of 68 MHz to provide a second low frequency signal at 2 MHz. A third downconverter 110 performs a downconversion of 76 MHz to provide a third low frequency signal at 2 MHz.

At the receiver, the transmitted signals are received at antenna 100 and provided to receiver (RCVR) 102. Receiver 102 filters and amplifies the received signal and provides it to first downconverter 104. Down-converter 104 is driven by local oscillator 106. The down converted signal is then provided to band pass filter 105 which filters the down converted signal to remove artifacts of the down conversion process. Downconverter 104 brings the received signal down to an intermediate frequency. The filtered signal is provide to a bank of second downconverters 110a–110j which downconvert the intermediate frequency signal to a low frequency signal . Each of downconverters 110a–110j is driven by a corresponding local oscillator 112a–112j. In the preferred embodiment, additional flexibility is provided wherein local oscillators 106 and 112a–112j are variable frequency synthesizers which output signals with frequencies determined by a control signal provided by control processor 114. The down converted signal are then provided to band pass filters 111a–111j, which band pass filter the down converted signals to remove artifacts from the down conversion process.

The low frequency filtered signals from bandpass filters 111a, 111b . . . 111j are provided to QPSK (quaternary Phase Shift Keying) demodulators 228a, 228b . . . 228j respectively. Each QPSK demodulator consists of an I-channel demodulator comprising mixer 212, cosine signal generator (COS) 210 and low pass filter 214 and a Q-channel demodulator comprising a mixer 213, a sine signal generator (which is approximately 90 out of phase with cosine generator 210) and low pass filter 215.

The I and Q channel QPSK demodulated signal are provided to analog to digital converters (A/D) respectively. Analog to digital converts 216 and 217 sample and quantize the QPSK demodulated signals and provide the digital signals to multiplexer 113.

Multiplexer 113 directs the downconverted signals to demodulator and searcher 116. In the first exemplary embodiment, all of the downconverted signals contain a different information and a single code channel is used for each frequency. Thus, if no multipath combining is to be performed, the downconverted data from each of downconverters 110a–110j can be filtered and passed directly to a single corresponding demodulator 118a–118n. If, on the other hand, multipath combining is desired, then the output of downconverters 110a–110j may be provided to more than one of demodulators 118a–118n. The demodulators can separately demodulate signals that traveled along different propagation paths, then combine those demodulated signals to provide an improved estimate of the transmitted signal is well known in the art and is described in detail in the aforementioned U.S. Pat. No. 5,109,390.

In an alternative embodiment or in addition to the first embodiment, a channel equalizer can be used. Although, many channel equalizer structures are known in the art, a preferred embodiment of the equalizer that operates in conjunction with a CDMA receiver is disclosed in detail in copending U.S. Pat. No. 5,692,006, issued Nov. 25, 1997, entitled "ADAPTIVE DESPREADER", which is assigned to the assignee of the present invention and incorporated by reference herein.

Within each of demodulator 118, the downconverted signal is unscrambled in descrambling means 120a–120n. Each of descrambling means 120a–120n is driven by a corresponding pseudonoise generator (PN GEN) 122a–122n. Each of the unscrambled signals is provided to a corresponding despreading means 124a–124n. It is understood by one skilled in the art that Walsh channels are but one method of providing CDMA channels and that the present invention is equally applicable to other methods of code channel generation and reception. In each of despreading means 124a–124n, the pilot channel is despread and the traffic channel is despread. The dot product of the traffic signal with the pilot signal is then performed to yield phase corrected estimates of the traffic data.

The unscrambled signal is provided to despreader 221. Despreader 221 multiplies the signal by a pilot signal which is generated by pilot signal generator ($W_{Pilot}$). The resultant signal is then low pass filtered to provide a despread pilot signal. The unscrambled signal is also provided to despreading means 222 which multiplies the unscrambled signal with a locally generated traffic Walsh sequence generated by Walsh traffic generators ($W_T$). The resultant signal provided by multiplier 222 is then accumulated by accumulator 224.

The accumulated signal from accumulator 224 and the filtered signal from low pass filter 223 are provided to inner product circuit 225. The design and implementation of inner product circuit 225 is described in detail in copending U.S. patent application Ser. No. 07/981,034, filed Nov. 24, 1992, now abandoned, which was continued as application Ser. No. 08/343,800, filed Nov. 21, 1994, now issued as U.S. Pat. No. 5,506,865, entitled "PILOT CARRIER DOT PRODUCT CIRCUIT", assigned to the assignee of the present invention and incorporated by reference herein. The despread data is then provided to buffer 226 which provides time alignment of the received signals so that diversity combination may be performed. The buffered signals are then provided to combiner 127 when multipath combination is desirable.

The combined symbol energies are provided to demultiplexer 128, which reorders the symbol stream performing the inverse operation of multiplexer 54 of FIG. 1. The demultiplexed energies are provided to trellis decoder 130. In the exemplary embodiment, trellis decoder 130 is a Viterbi decoder or a MAP decoder, the design of which is known in the art. The decoded data is then provided in frames to CRC check 132 which checks the accuracy of the received frame. If the frame passes the CRC check then the data is provided to the user and if the CRC check fails a frame erasure is declared.

II. Multiple Code Channels Per Carrier for Increased Flexibility and/or Throughput In a second embodiment of the present invention, the encoded symbols are provided on a plurality of frequencies and with multiple code channels on at least one of plurality of frequencies as illustrated by Table 2 below.

TABLE 2

| | | | | | |
|---|---|---|---|---|---|
| $BS_1, f_1, C_1$ | $S_1$ | $S_4$ | $S_7$ | $S_{10}$ | ■ |
| $BS_1, f_1, C_2$ | $S_2$ | $S_5$ | $S_8$ | $S_{11}$ | ■ |
| $BS_1, f_2, C_1$ | $S_3$ | $S_6$ | $S_9$ | $S_{12}$ | ■ |

It should be noted that the hardware necessary to demodulate a signal comprises the majority of hardware necessary to search a candidate frequency band to determine whether service is available on that frequency. As will be described later herein, the second embodiment can be used in combination with the first embodiment to maintain a constant level of data throughput while allowing a subset of the downconverters to be used to search different frequencies. Thus, when one or more of down converters 110a–110j are allocated to the task of searching other frequency bands, the data throughput to the receiver can be maintained by allocating more than one code channel on one of the frequencies being received by remote station 134. In addition, this embodiment provides for ability to provide increased throughput to a mobile station by using available additional capacity on carriers which may not be available on all carriers. Thus, this embodiment assists in both maximizing the throughput to the mobile station and aiding in hard handoff.

In the second embodiment of the present invention, a frame of data to be transmitted by base station 80 is provided to CRC generator 50. CRC generator 50 generates and appends a set of cyclic redundancy check (CRC) bits to the frame of data and appends a set of tail bits. The frame is then provided to encoder 52. In the exemplary embodiment, encoder 52 is a convolutional encoder. The encoded symbols are provided to multiplexer (MUX) 54. Multiplexer 54 provides the encoded symbols of the frame on different outputs based on a signal from control processor 56. Each output of multiplexer 54 is provided to a corresponding code channel modulator 57a–57n. In the first exemplary embodiment, more than one code channel is allocated for at least one frequency.

Each of spreading means 58a–58n is driven by a corresponding Walsh symbol generator 60a–60n. In the exemplary embodiment, each of Walsh symbol generators 60a–60n outputs a spreading sequence that is mutually orthogonal to the remaining spreading sequences. Again, one skilled in the art will understand that the present invention is equally applicable to other forms of code channel generation. In the exemplary embodiment, each of the spread signals from spreading means 58a–58n are provided to a corresponding scrambling means 62a–62n. Scrambling means 62a–62n scramble the data in accordance with scrambling sequence provided by PN generators 64a–64n. The method and apparatus for performing orthogonal spreading and for performing scrambling in accordance with a pseudonoise sequence is described in detail in the aforementioned U.S. Pat. Nos. 4,901,307 and 5,103,459.

The modulated data from scramblers 62a–62n are provided to multiplexer 65 which directs the data to one of summers 66a–66j. In the second embodiment wherein more than one code channel is allocated for at least one frequency band, multiplexer 65 provides the spread data to be transmitted on a single frequency to a summer 66a–66j which combines the spread spectrum data for transmission on a single frequency. The summed signals are provided to upconverters 68a–68j which combines the spread data for transmission on a single frequency. Each of upconverters 68a–68j are driven by a corresponding local oscillator 70a–70j each of which outputs a different frequency driving signal. The upconverted signals are provided to transmitter 72, which filters and amplifies the signal and provides it for transmission through antenna 74.

At the receiver, the transmitted signals are received at antenna 100 and provided to receiver (RCVR) 102. Receiver 102 filters and amplifies the received signal and provides it to downconverter 104. Down-converter 104 is driven by local oscillator 106. Downconverter 104 brings the received signal down to an intermediate frequency. The down converted signal is band pass filtered by filter 105 to remove artifacts of the down conversion process. The intermediate frequency signal is provide to the bank of downconverters 110a–110j which downconvert the intermediate frequency signal to a low frequency signal. Each of downconverters 110a–110j is driven by a corresponding local oscillators 112a–112j. The down converted signals are band pass filtered by a band pass filters 111a–111j to remove artifacts from the down conversion process. In the preferred embodiment, additional flexibility is provided wherein local oscillators 106 and 112a–112j are variable frequency synthesizers which output driving signal with frequencies determined by control signals provided by control processor 114.

The low frequency filtered signals from bandpass filters 111a, 111b . . . 111j are provided to QPSK (quaternary Phase Shift Keying) demodulators 228a, 228b . . . 228j respectively. Each QPSK demodulator consists of an I-channel demodulator comprising mixer 212, cosine signal generator (COS) 210 and low pass filter 214 and a Q-channel demodulator comprising a mixer 213, a sine signal generator (which is approximately 90 out of phase with cosine generator 210) and low pass filter 215.

The I and Q channel QPSK demodulated signal are provided to analog to digital converters (A/D) respectively. Analog to digital converts 216 and 217 sample and quantize the QPSK demodulated signals and provide the digital signals to multiplexer 113.

Multiplexer 113 directs the downconverted signals to demodulator and searcher 116. In the second exemplary embodiment, at least one of the down converted data streams will be provided to more than one demodulator 118a–118n. In addition, multipath combining may be performed by providing of the downconverted signals to more than one of demodulators 118a–118n and separately demodulating the signals that have traveled over differing propagation paths. The separately demodulated multipath signals are then provided to combiner 127. Combination of received signal from multiple paths of propagation is well known in the art and is described in detail in the aforementioned U.S. Pat. No. 5,109,390.

Within each of demodulators 118a–118n, the downconverted signal is unscrambled by descrambling means 120a–120n. Each of descrambling means 120a–120n is driven by a pseudonoise generator (PN GEN) 122a–122n. The descrambled signals are then provided to despreading means 124a–124n. In each of despreading means 124a–124n, the pilot channel is despread and the traffic channel is despread. The dot product of the traffic signal with the pilot signal is then performed to yield phase corrected estimates of the traffic data.

The accumulated signal from accumulator 224 and the filtered signal from low pass filter 223 are provided to inner product circuit 225. The design and implementation of inner product circuit 225 is described in detail in copending U.S. patent application Ser. No. 07/981,034, filed Nov. 24, 1992, now abandoned, which was continued as application Ser. No. 08/343,800, filed Nov. 21, 1994, now issued as U.S. Pat. No. 5,506,865, entitled "PILOT CARRIER DOT PRODUCT CIRCUIT", assigned to the assignee of the present invention and incorporated by reference herein. The despread data is then provided to buffer 226 which provides time alignment of the received signals so that diversity combination may be performed. The buffered signals are then provided to combiner 127 when multipath combination is desirable.

The combined symbol energies are provided to demultiplexer 128, which reorders the symbol stream, performing the inverse operation of multiplexer 54. The demultiplexed symbol energies are provided to trellis decoder 130. In the exemplary embodiment, trellis decoder 130 is a Viterbi decoder or a MAP decoder, the design of which is known in the art. The decoded data is then provided in frames to CRC check 132 which checks the accuracy of the received frame. If the frame passes the CRC check then the data is provided to the user and if the CRC check fails an erasure is declared.

III. Providing Selective Redundancy for Increased Reliability

In a third embodiment of the present invention, the encoded symbols are transmitted on a plurality of frequencies and with single code channel per carrier and a subset of the encoded symbols are redundantly transmitted on a different carrier from at least one additional base station as illustrated in Table 3.

TABLE 3

| | | | | | |
|---|---|---|---|---|---|
| $BS_1, f_1$ | $S_1$ | $S_4$ | $S_7$ | $S_{10}$ | |
| $BS_1, f_2$ | $S_2$ | $S_5$ | $S_8$ | $S_{11}$ | ■ |
| | | | | | ■ |
| $BS_1, f_3$ | $S_3$ | $S_6$ | $S_9$ | $S_{12}$ | ■ |
| $BS_2, f_1$ | $S_2$ | $S_5$ | $S_8$ | $S_{11}$ | |

Figure 4:
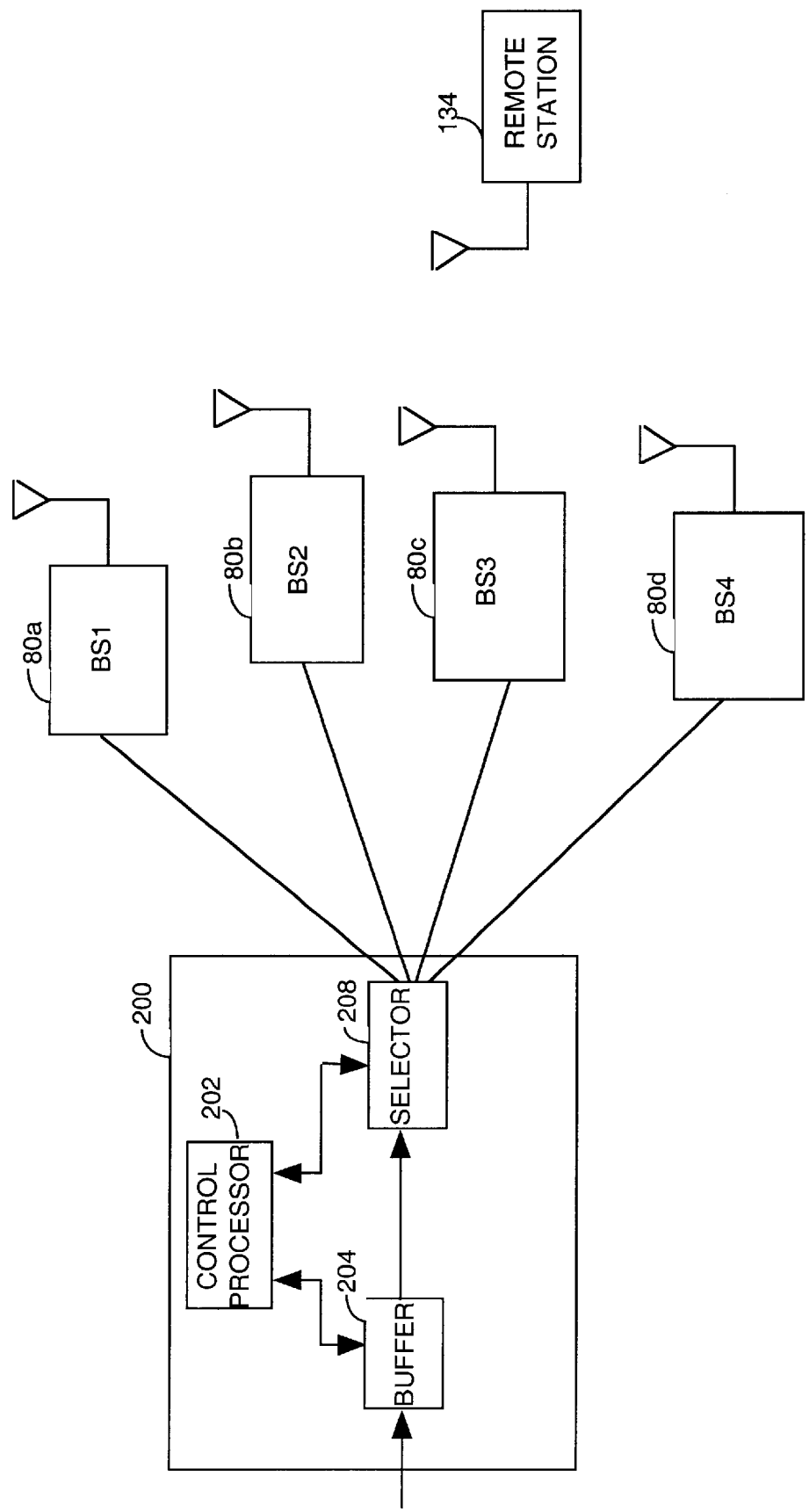
FIG. 4 is a block diagram of the wireless network structure for multiplexing the data onto a plurality of base stations.

Referring to FIG. 4, data to be transmitted to remote station 134 is provided to base station controller 200, which routes the data to the appropriate base station (BS) or base stations 80a–80d. The data is provided to buffer 204, which in the exemplary embodiment sends a signal indicative of the amount and priority of data queued for transmission control processor 202. Control processor 202 determines which of base stations 80a–80d will be used to transmit the data to remote station 134. In the exemplary embodiment, control processor 202, also determines what frequencies and code channels will be used, though it will be readily understood by one skilled in the art that this function as well as other functions of the base station controller could be performed at base stations 80a–80d. Control processor 202 sends a signal to buffer 204 indicating the amount of data to be provided to selector 208. Selector 208, in accordance with a signal from control processor 202 routes the data to the selected ones of base stations 80a–80d.

In the this embodiment, the first base station (BS1) 80a transmits the encoded symbols as described with respect to the first embodiment of the invention wherein symbols are multiplexed onto carriers $f_1$, $f_2$ and $f_n$. In addition to the symbols transmitted by the first base station 80a, a redundant set of bits are transmitted from base station (BS2) 80b on a carrier or set of carriers of a frequency different from that used to transmit the bits from base station 80a. Referring to the example provided in Table 3, encoded symbols $S_1$, $S_2$ and $S_3$ are transmitted on frequencies $f_1$, $f_2$ and $f_3$ from base station 80a. This operation is performed as described with respect the first embodiment. In addition a second base station 80b redundantly transmits symbol $S_2$. In the preferred embodiment, symbol $S_1$ is transmitted on frequency $f_1$ which is different from the frequency $f_2$ upon which symbol $S_2$ was transmitted from base station 80a. This provides for frequency diversity in the transmission of symbol $S_2$ which can improve performance in the face of frequency dependent fading conditions in addition to providing spatial path diversity.

IV. Providing Total Redundancy for Increased Reliability

In a fourth embodiment of the present invention, the encoded symbols are transmitted on a plurality of frequencies and with single code channel per carrier and all of the encoded symbols are redundantly transmitted on a different carrier from at least one additional base station as illustrated in Table 4.

TABLE 4

| | | | | | |
|---|---|---|---|---|---|
| $BS_1, f_1$ | $S_1$ | $S_4$ | $S_7$ | $S_{10}$ | |
| $BS_1, f_2$ | $S_2$ | $S_5$ | $S_8$ | $S_{11}$ | ■ |
| $BS_1, f_3$ | $S_3$ | $S_6$ | $S_9$ | $S_{12}$ | ■ |
| | | | | | ■ |
| $BS_2, f_1$ | $S_1$ | $S_4$ | $S_7$ | $S_{10}$ | |
| $BS_2, f_2$ | $S_2$ | $S_5$ | $S_8$ | $S_{11}$ | |
| $BS_2, f_3$ | $S_3$ | $S_6$ | $S_9$ | $S_{12}$ | |

Referring to FIG. 4, data to be transmitted to remote station 134 is provided to base station controller 200, which routes the data to the appropriate base station (BS) or base stations 80a–80d. The data is provided to buffer 204, which sends a signal indicative of the amount and priority of the data queued to control processor 202. Control processor 202 determines which of base stations 80a–80d will be used to transmit the data to remote station 134. In the exemplary embodiment, control processor 202, also determines what frequencies and code channels will be use. Control processor 202 sends a signal to buffer 204 indicating the amount of data to be provided from buffer 204 to selector 208. Selector 208, in accordance with a signal from control processor 202 routes the data to the selected ones of base stations 80a–80d.

In the fourth embodiment, the first base station (BS1) 80a transmits the encoded symbols provided as described with respect to the first embodiment of the invention wherein symbols are multiplexed onto carriers $f_1$, $f_2$ and $f_n$. In addition to the symbols transmitted by the first base station 80a, a redundant set of all the encoded symbols are transmitted from base station (BS2) 80b on the same frequencies used to transmit the bits from base station 80a. Referring to the example provided in Table 4, encoded symbols $S_1$, $S_2$ and $S_3$ are transmitted on frequencies $f_1$, $f_2$ and $f_3$ from base station 80a. This operation is performed as described with respect the first embodiment. In addition, a second base station 80b redundantly transmits symbol $S_1$, $S_2$ and $S_3$ on frequencies $f_1$, $f_2$ and $f_3$.

By using the same frequencies to transmit to remote station, remote station 134 can use half the number of downconverters as would be necessary if the frequencies were exclusive sets. Referring back to FIGS. 2A–2B, the signals from base stations 80a and 80b are received at antenna 100 and provided through receiver 102 to initial down converter 104. Down converter 104 provides the intermediate frequency signal to bank of down converters 110a–110j. In the present example only three such secondary downconverters are needed to provide for demodulation of both signals. So in the example the intermediate frequency signal is provided to three of downconverters 110a–110j which perform the down conversion to baseband of data transmitted on frequencies $f_1$, $f_2$ and $f_3$, respectively.

In a first embodiment, the data from down converter 110a is provided to two separate demodulators 118. One of demodulators 118 demodulates the signal transmitted from base station 80a and the second demodulates the data transmitted from base station 80b. More demodulators 118 are employed if diversity combination of multipath signals is desired. The two demodulated signals are then combined in combiner 127 before being provided to demultiplexer 128. The first embodiment provides flexibility so that base stations 80a to use the same or different code channels for the transmission of the code symbols.

In a second embodiment, the same code channels are used for transmission to remote station 134 from base station 80a and from base station 80b and the arrival time of frames at remote station 134 is synchronized. In the second embodiment, the down converted data from downconverter 110a need only be provided to a single demodulator 118a and symbol energy combining need only be provided when multipath combination is desired. A channel equalizer can be employed to resolved small difference in arrival time of the redundant signals.

V. Providing Total Redundancy for Increased Reliability

In a fifth embodiment of the present invention, the encoded symbols are transmitted on a plurality of frequencies and with single code channel per carrier and a set of entirely different encoded symbols are transmitted on different carriers from at least one additional base station as illustrated in Table 5.

TABLE 5

| | | | | |
|---|---|---|---|---|
| $BS_1, f_1$ | $S_1$ | $S_7$ | $S_{13}$ | $S_{19}$ |
| $BS_1, f_2$ | $S_2$ | $S_8$ | $S_{14}$ | $S_{20}$ |
| $BS_1, f_3$ | $S_3$ | $S_9$ | $S_{15}$ | $S_{21}$ |
| $BS_3, f_4$ | $S_4$ | $S_{10}$ | $S_{16}$ | $S_{22}$ |
| $BS_3, f_5$ | $S_5$ | $S_{11}$ | $S_{17}$ | $S_{23}$ |
| $BS_3, f_6$ | $S_6$ | $S_{12}$ | $S_{18}$ | $S_{24}$ |

In the this embodiment, the first base station (BS1) 80a transmits the encoded symbols $S_1$, $S_2$ and $S_3$ on frequencies $f_1$, $f_2$ and $f_3$ and base (BS2) transmits symbols $S_4$, $S_5$ and $S_6$ on frequencies $f_4$, $f_5$ and $f_6$. Referring to FIG. 4, data to be transmitted to remote station 134 is provided to base station controller 200. Base station controller 200 allocates the portions of the data to be transmitted by the base stations in communication with remote station 134. In the present example, base station controller allocates half of the data to be transmitted by base station 80a and half of the data to be transmitted by base station 80b. Selector 208 routes encoded symbols $S_1$, $S_2$ and $S_3$ to base station 80a and routes $S_4$, $S_5$ and $S_6$ to base station 80b. Base station 80a transmits the encoded symbols on frequencies $f_1$, $f_2$ and $f_3$ and base station 80b transmits the encoded symbols on frequencies $f_4$, $f_5$ and $f_6$ transmission is performed as described with respect to the first embodiment.

Referring back to FIG. 2, the signals from base stations 80a and 80b are received at antenna 100 and provided though receiver 102 to down converter 104. Down converter 104 provides the intermediate frequency signals to bank of down converters 110a–110j. In the present example, six secondary downconverters are needed to provide for down conversion of both signals.

Each of the down converted signal is provided to a corresponding demodulator 118. If multipath combination is desired or needed, then a single output from one of downconverters 110 is provided to more than one demodulator 118. The data from down converter 110a is provided to two separate demodulators 118. The data is passed to demultiplexer 128 which reassembles the output data stream such that the encoded symbols are output in the order $S_1$, $S_2$, $S_3$, $S_4$, $S_5$ and $S_6$. The output sequence is provided to trellis decoder 130 and decoded before the resulting decoded frame is checked by CRC check 132.

VI. Providing Total Redundancy for Increased Reliability

In a sixth embodiment of the present invention, the encoded symbols are redundantly transmitted from a plurality of base stations on the same frequencies as illustrated in Table 6.

TABLE 6

| | | | | |
|---|---|---|---|---|
| $BS_1, f_1$ | $S_1$ | $S_4$ | $S_7$ | $S_{10}$ |
| $BS_2, f_1$ | $S_1$ | $S_4$ | $S_7$ | $S_{10}$ |
| $BS_3, f_4$ | $S_2$ | $S_5$ | $S_8$ | $S_{11}$ |
| $BS_4, f_4$ | $S_2$ | $S_5$ | $S_8$ | $S_{11}$ |
| $BS_3, f_6$ | $S_3$ | $S_6$ | $S_9$ | $S_{12}$ |
| $BS_4, f_6$ | $S_3$ | $S_6$ | $S_9$ | $S_{12}$ |

In the this embodiment, the first base station (BS1) 80a transmits the encoded symbol $S_1$, on frequencies $f_1$, base station (BS2) 80b redundantly transmits the symbol $S_1$ on frequency $f_1$, base station (BS3) 80c transmits symbols $S_2$ and $S_3$ on frequencies $f_4$ and $f_6$ and base station (BS4) 80d transmits symbols $S_2$ and $S_3$ on frequencies $f_4$ and $f_6$. Referring to FIG. 4, data to be transmitted to remote station 134 is provided to base station controller 200. Base station controller redundantly directs the data to be transmitted to each base station in communication with remote station 134. Selector 208 routes encoded symbol $S_1$ to base station 80a symbols $S_1$ to base station 80b and symbols $S_3$ and $S_4$ to base stations 80c and 80d. Base station 80a transmits the encoded symbol on frequency $f_1$ and base station 80b transmits symbols on frequency $f_1$, base station 80c transmits symbols $S_1$ and $S_2$ on frequencies $f_4$ and $f_6$ respectively and base station 80d transmits symbols $S_1$ and $s_2$ on frequencies $f_4$ and $f_6$ respectively.

Referring back to FIGS. 2A–2B, the signals from base stations 80a and 80b are received at antenna 100 and provided though receiver 102 to down converter 104. Down converter 104 provides the intermediate frequency signals to bank of down converters 110a–110j. In the present example, six secondary downconverters are needed to provide for down conversion of both signals.

Each of the down converted signals is provided to a corresponding demodulator 118. If multipath combination is desired or needed, then a single output from one of down converters 110 is provided to more than one demodulator 118. The data from down converter 110a is provided to two separate demodulators 118. Combiner 127 combines the energies of the received symbols $S_1$, $S_2$ and $S_3$ from base station 80a with the energies of the received symbols $S_1$, $S_2$ and $S_3$ from base station 80b. The data is passed to demultiplexer 128 which reassembles the output data stream such that the encoded symbols are output in the order $S_1$, $S_2$, $S_3$ and $S_4$. The output sequence is provided to trellis decoder 130 and decoded before the resulting decoded frame is checked by CRC check 132.

VII. Search for Alternative Systems

Another aspect of the present invention is the flexibility to allow a mobile station to search for alternative systems or base stations in the area while remaining in high speed communication. In a first embodiment for searching for alternative systems, base station 80 need not know of the intention of remote station 134 to perform an alternative system search.

In this first embodiment, remote station 134 simply sets one or more of local oscillators 110 into a search mode wherein it temporarily stops downconverting data being transmitted to it and searches other frequencies to determine whether they are available to provide reliable communications. During this period remote station 134 depends on the data received on the other frequencies in combination with the error correcting capabilities of trellis decoder 130 to provide an acceptable level of communication. In a preferred implementation of the first embodiment, mobile station 134 alerts the base station or base stations in communication with it, that it will temporarily place the secondary down converter into a search mode. In response to this message the base or base stations 80 which are in communication with the remote station 134 begin to transmit the data which is provided on channel other than the one temporarily not being received by mobile station 134 at a higher power level. An alternative response of base station 80 to the message from remote station 134 is to begin transmitting to remote station 134 at a lower rate such that the signals that were being received the downconverters that are in search mode are not necessary.

In a second embodiment for searching alternative system, mobile station 134 informs the base station of its intention to place one or more of down converters 110 into a search mode, and base station 80 redefines the channel allocations such that the data may be maintained at the same level. For example, if base station 80 is transmitting to remote station 134 on one code channel on each of frequencies $f_1$, $f_2$ and $f_3$, then if one down converter is placed in search mode such that remote station 134 cannot receive data transmitted on $f_1$, then base station 80 will transmit to remote station 134 using an additional code channel on either frequency $f_2$ or $f_3$.

VIII. Multiple Paging Channel Reception

Another aspect of the present invention is to provide increased reliability and speed in paging remote station 134. A base station 80 attempting to page a remote station 134, does so by providing the paging message on multiple frequencies or from multiple base stations as described previously with respect to traffic data. Remote station 134 monitors the paging channel on a plurality of frequencies or from a plurality of base stations. This increases the reliability of paging the remote station 134 through frequency and spatial diversity as described above.

IX. Alternative Receiver Structures

Figure 5:
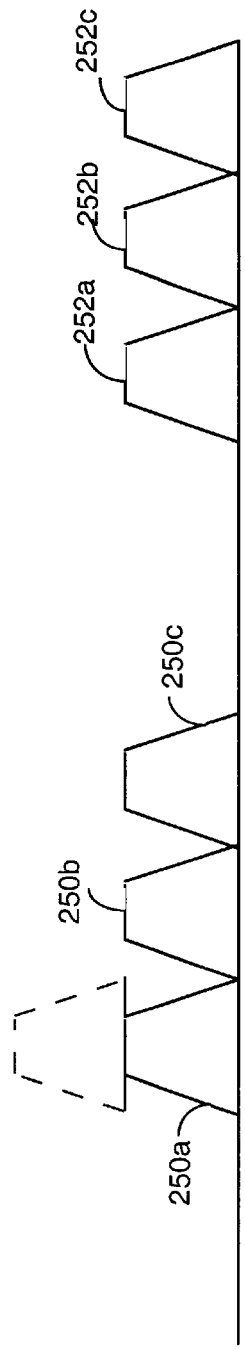
FIG. 5 is a frequency band diagram to assist in the description of the improved receiver structure illustrated in FIG. 6.

FIG. 5 illustrates a frequency band allotment of two separate 5 MHz (or 3.75 MHz) bands. The first group of adjacent carriers is illustrated by frequency bands 250a, 250b and 250c. The second group of adjacent carriers is illustrated by carriers 252a, 252b and 252c. The receiver structure illustrated in FIG. 6 is capable of receiving information on the three carriers 250a, 250b and 250c and simultaneously searching or receiving data on one of carriers 252a, 252b and 252c.

Figure 6:
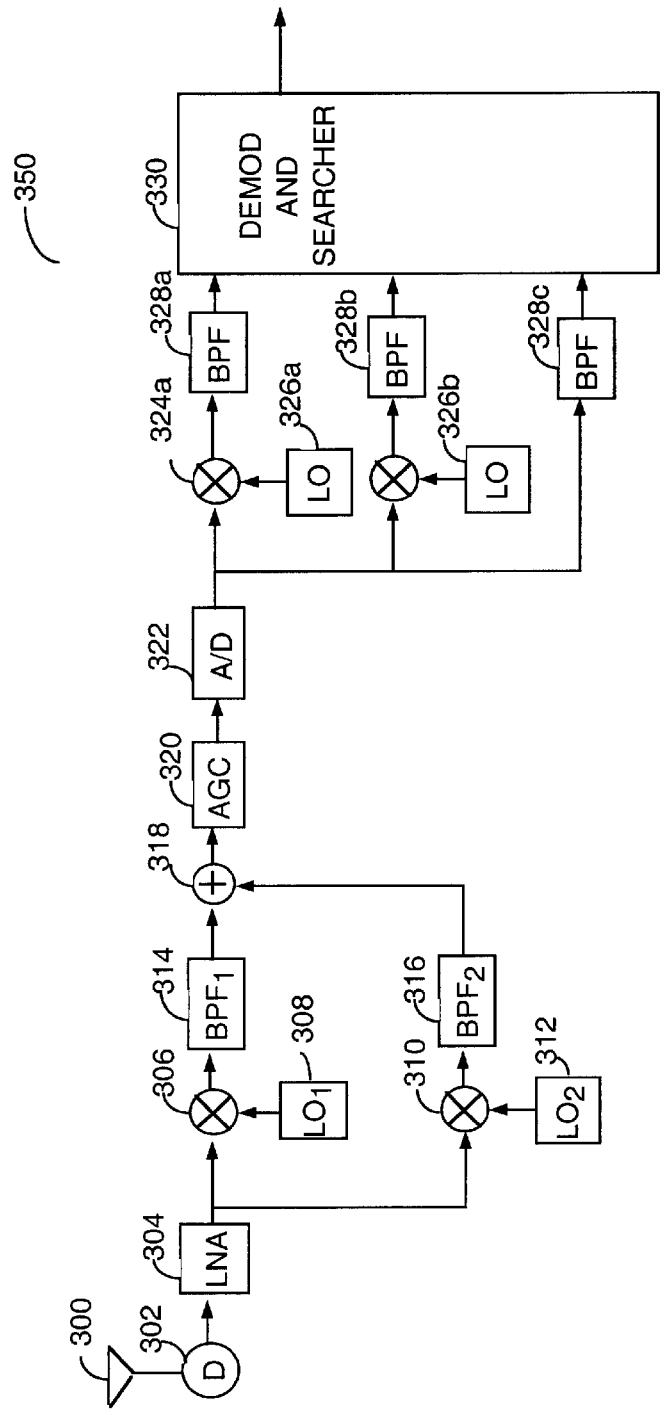
FIG. 6 is a block diagram of a receiver structure which provides for reduced hardware requirement in the reception of signals transmitted in accordance with the present invention.

To illustrate the operation and advantages of the receiver in FIG. 6, it will be assumed that the mobile station in which receiver 350 is located is currently receiving data on carriers 250a, 250b and 250c and that the mobile station will search band 252a to determine whether it is capable of receiving service from the system providing the signal comprising carriers 252a, 252b and 252c. It will be understood by one skilled in the art that data for the mobile station could be provided on carriers 252a, 252b or 252c by simply changing the searching operation to a demodulation operation.

Signals 250a, 250b, 250c and 252a are received at antenna 300 and provided through duplexer 302 to low noise amplifier (LNA) 304. The amplified signal is provided to mixer 306. Mixer 306 down converts the signal in accordance with a signal provided by local oscillator 308 which brings the 5 MHz band consisting of carriers 250a, 250b and 250c down to a MHz wide baseband signal. The down converted signal is low pass filtered by filter (BPF$_1$) 314 which is a low pass filter with a 5 MHz pass band. The received signal is also provided to downconverter 310 which brings the signal carried on carrier 252a down to base band. The down converted signal is low pass filtered by filter (BPF$_2$) 316 which is a low pass filter with a 1.23 MHz pass band.

The filtered signal from filter 314 is summed with the filtered signal from filter 316 in summer 318. The summed signal is amplified by automatic gain control (AGC) 320. The amplified signal is provided to analog to digital (A/D) converter 322. The digital signals are provided to downconverters 324a, 324b and filter (BPF) 328c. Downconverters 324a and 324b bring the signals carried on carriers 250b and 250c down to base band. The signal carried on carriers 250a and 252a are already at baseband and is provided directly to filter 328c. The signals 250a and 252a act as interference to one another in the demodulation process but given sufficient coding and spreading gain, both the signals can be demodulated. In the present context of searching, it more often than not be the case that no signal is found and in that case the signal degradation will be minimum.

Downconverter 324a and downconverter 324b are driven by local oscillators 326a and 326b respectively. The down converted signals are provided to filters 328a and 328b, which are low pass filters with a 1.228 MHz pass band. Similarly, filter 328c is a low pass filter with a 1.228 MHz pass band. The base band signals are then provided to demodulator and searcher 330 which operate as described with respect to demodulator and searcher 116 of FIG. 2. The signal provided through filter 328c can be demodulated by two demodulators, one to demodulate the signal transmitted from the first system (on carrier 250a) and one to demodulate the signal transmitted by the second system (on carrier 252a). In the alternative, a single demodulator can be time shared demodulating the signal from the first system and at certain intervals demodulating the signal transmitted from the second system.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for transmitting a plurality of symbols, comprising:

encoding each of the plurality of symbols with a channel code;

modulating simultaneously each of a plurality of frequencies by an encoded symbol, wherein at least one carrier frequency from the plurality of carrier frequencies is simultaneously modulated by multiple different encoded symbols; and transmitting the modulated frequencies.

2. A wireless receiver configured to receive, demodulate, and decode the plurality of symbols transmitted in accordance with the method of claim 1.

3. The method of claim 1, wherein each set of symbols contains the same number of elements.

4. The method as claimed in claim 1 wherein said encoding each of the plurality of symbols with a channel code comprises encoding each of the plurality of symbols with an orthogonal channel code.

* * * * *